United States Patent [19]
Fletcher et al.

[11] 3,955,034
[45] May 4, 1976

[54] THREE-COMPONENT CERAMIC COATING FOR SILICA INSULATION

[76] Inventors: James C. Fletcher, Administrator of the National Aeronautics and Space Administration, with respect to an invention of; Alexander Pechman, Mountain View; Robert M. Beasley, all of Sunnyvale, Calif.

[22] Filed: June 24, 1974

[21] Appl. No.: 482,105

[52] U.S. Cl. ............................. 428/332; 106/54; 427/376; 427/379; 427/380; 427/402; 428/428; 428/450; 428/538; 428/920
[51] Int. Cl.² ................. C04B 35/14; C04B 43/00
[58] Field of Search ............. 117/70 B, 70 A, 70 R, 117/70 S, 125, 129; 427/376, 379, 380, 402; 106/52, 54; 428/332, 428, 450, 538, 920

[56] References Cited
UNITED STATES PATENTS

| | | | |
|---|---|---|---|
| 2,379,507 | 7/1945 | Deyrup | 117/125 X |
| 2,627,101 | 2/1953 | Le Clercq | 117/70 A X |
| 3,364,041 | 1/1968 | Swain et al. | 106/52 |
| 3,389,214 | 6/1968 | Smothers | 117/125 X |
| 3,458,345 | 7/1969 | Fenner | 117/125 X |
| 3,637,425 | 1/1972 | McMillan et al. | 117/125 |

FOREIGN PATENTS OR APPLICATIONS

| | | | |
|---|---|---|---|
| 567,424 | 12/1958 | Canada | 427/376 |

*Primary Examiner*—Ralph Husack
*Attorney, Agent, or Firm*—Carl O. McClenny; John R. Manning; Marvin F. Matthews

[57] ABSTRACT

Low density, fibrous, rigid, silica insulations are rendered impervious to moisture by application of a ceramic glaze coating comprising a silica barrier layer, an emissivity layer comprising a high silica glass component and an emmissivity agent and an overglaze layer comprising a high silica glass component and a borosilicate glass component. The resulting three-layered ceramic glaze laminate adhered to the fibrous silica insulation provides a moisture-impervious insulating material which exhibits a high emmissivity and is resistant to delamination and spalling at repeated cycles of thermal shock.

13 Claims, 1 Drawing Figure

U.S. Patent   May 4, 1976   3,955,034
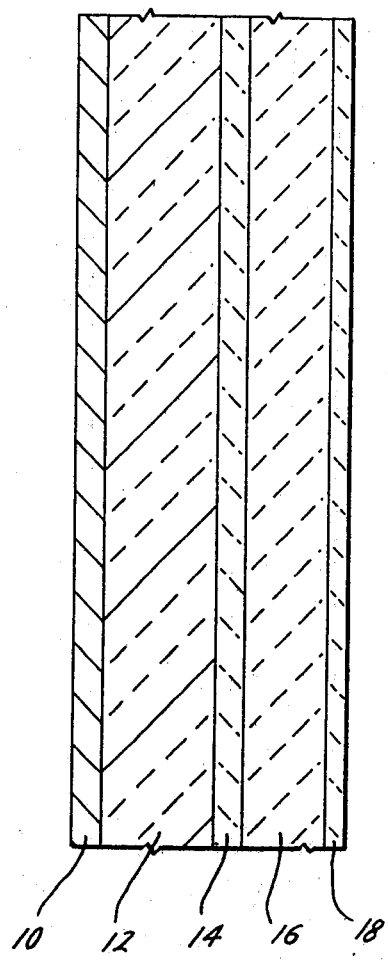

THREE-COMPONENT CERAMIC COATING FOR SILICA INSULATION

BACKGROUND OF THE INVENTION

1. Field of the Invention

The present invention relates to ceramic glaze coatings, and more particularly to ceramic glaze coatings for application to low density, fibrous, rigid silica insulation.

2. Description of the Prior Art

In recent years, rigid, fibrous silica insulations have been developed with densities as low as 9 pounds per cubic foot for possible application as a lightweight reusable surface insulating material. Such insulating materials find application, for example, in space shuttle hardware where low density and very low thermal conductivity are requirements for the insulating material. In that the low density, fibrous, refractory, silica insulations are quite porous and readily absorb moisture, it is necessary to coat the surface of such insulations with a coating which renders them impervious to moisture. Also, to be economical for such uses, the insulating materials must be reusable. That is, the insulation must repeatedly withstand the extreme temperature changes of approximately 2,500°F. which are occasioned by re-entry into the atmosphere from space without delamination or spalling of the insulation.

It is known in the art that silicon-containing substrates can be coated with protective ceramic compositions. See, for example, U.S. Pat. Nos. 3,637,425 and 3,458,345. However, such ceramic compositions are inadequate for use in space shuttle applications because they will not withstand repeated severe thermal cycling in the temperature ranges encountered in such applications without delamination. Moreover, such coatings do not provide the high emissivity levels desirable for such applications.

It is an object of the instant invention to provide a ceramic glaze coating for low density, fibrous, rigid silica insulation which overcomes the aforementioned problems. Moreover, it is an object of the present invention to provide a moisture-impervious ceramic glaze coating for rigid, low density, fibrous silica insulations. Further, it is an object of the instant invention to provide a hard ceramic glaze coating with a high emissivity and a low coefficient of thermal expansion which withstands thermal cycling in the range of −250°F. to 2,500°F.

SUMMARY OF THE INVENTION

It has been found that the aforementioned objects are accomplished by coating low density, fibrous, rigid silica insulations with a three-layer ceramic glaze coating comprising a silica barrier coat, an emissivity coat consisting essentially of a high silica glass and an emissivity agent, and an overglaze coat consisting essentially of a high silica glass and a borosilicate glass. The three-layered ceramic glaze laminate formed by sequentially applying and firing the three aforementioned coatings provides a moisture-impervious insulation which exhibits a high emissivity and is resistant to delamination and spalling at repeated cycles of thermal shock occasioned by re-entry from space.

BRIEF DESCRIPTION OF THE DRAWING

The attached FIGURE depicts a low density, fibrous, silica insulation adhered to a metallic substrate over which is disposed the three-layered ceramic glaze coating of the instant invention.

DESCRIPTION OF THE PREFERRED EMBODIMENTS

In accordance with the instant invention, there are provided ceramic glaze coatings and a method for treating low density, rigid, fibrous silica insulating materials, generally adhered to a metallic substrate, to thereby render such insulations non-porous and impervious to moisture. Silica insulations coated in accordance with the instant invention are suitable for use in environments in which the insulation must withstand repeated exposures to alternating high and low temperatures. Although the ceramic glaze coatings of this invention are ideally suited for application over fibrous silica insulation substrates, which in turn are generally adhered to a metallic base, the ceramic coatings are also suitable for rendering impervious to moisture other substrates adhered to other base materials or substrates.

The fibrous, silica insulation to which coatings of this invention are applied generally exhibit a density in the range of from about 9 to about 20 pounds per cubic foot and are characterized as fibrous. Such insulations exhibit a low coefficient of thermal expansion, generally in the range of $2.0$–$5.0 \times 10^{-7}$ inch/inch/°F. and a low emissivity at temperatures in the range of 2,000°–2,500°F. Being fibrous, such insulations readily absorb moisture and, for this reason, must be coated with a suitable ceramic glaze coating.

The first layer or coat of the ceramic glaze coating of the instant invention is designated a barrier coat. One of the functions served by the barrier coat is to separate the fibrous silica insulation substrate from the other layers of the ceramic glaze coating with which it may be reactive. It may also aid in the control of the weight build-up of the emissivity coating during application of the slurry. Additionally, the barrier coat must have a coefficient of thermal expansion approximately equal to the rigid, fibrous silica insulation substrate so that it will withstand repeated thermal cycles without delamination. Moreover, it must be dense and relatively non-porous. Finally, it must be compatible with the emissivity coating. Although a great number of silica-type materials having a coefficient of thermal expansion near that of the fibrous silica insulation substrate have been evaluated, most are unacceptable. For example, cordierite ($2MgO.2Al_2O_3.SiO_2$) was found to be unacceptable in that it could not withstand temperatures in the vicinity of 2,500°F. A refractory cement of the MgO-clay composition (Norton RM 779) was also unacceptable in that it absorbed the glaze overcoat. Other silicas such as Cab-O-Sil (calcined at 2,000°–2,200°F., 200 mesh) and a silica fiber (calcined at 2,000°F.) were also unsuccessful.

The barrier coat of the instant invention is a fused silica fired to a hard surface at a temperature in the range of 1,700°–2,500°F. Firing the silica at a temperature in this range is necessary in order to promote sufficient density and reduce the porosity of the barrier coat. The fused silica generally contains not less than 99.6% silica ($SiO_2$) and is generally applied in aqueous slip form. The fused silica aqueous slip generally contains from about 80% to about 90% solids and the grain size of the silica particles are such that there is no greater than about 3% retention on a Standard No. 325 sieve.

The barrier coat layer is applied in the form of the slip as above-described to a thickness of from about 4 to about 8 mils. A thickness of about 4 mils is considered minimum in order to assure coverage of the fibrous silica insulation substrate. A thickness in excess of 8 mils is satisfactory; however, there is generally little incentive in employing greater thicknesses other than attaining increased strength with an attendant weight increase. After application, the insulating material substrate containing the barrier coat layer is dried and is then placed in a furnace at a temperature of from about 1,700°F. to about 2,500°F. and preferably from about 2,200°F. to about 2,500°F. and fired for approximately 15 minutes. A longer time is acceptable but generally unnecessary. Thereafter, the specimen is cooled to ambient temperature before proceeding with the application of the second layer of the ceramic glaze coating.

The second layer of the instant ceramic glaze coating is designated the emissivity layer. Its function is to provide in the ceramic glaze coating a high emissivity level to facilitate radiant heat transfer from the ceramic coating during re-entry and to provide for a high degree of reflection of the radiant energy directed at the surface of the ceramic glaze coated substrate. The emissivity coat layer comprises a high refractory emissivity agent incorporated in a high silica glass composition. Examples of high refractory emissivity agents suitable in the instant invention include silicon carbide, chrome oxide, cobalt oxide, nickel oxide, nickel-chrome spinel, silicon nitride and calcined mixed oxides of iron, chrome and cobalt (Ferro Black Stain F–3794) and mixtures thereof. Preferred emissivity agents are silicon carbide, Ferro Black Stain F–3794 and mixtures thereof. Especially preferred is silicon carbide which provides an emissivity level in the resulting coating of from about 0.89 to about 0.93. The other emissivity agents provide slightly lower emissivity levels; however, it may be desirable to combine emissivity agents depending upon the spectral range of interest.

This high silica glasses suitably employed in the emissivity layer generally contain not less than 94% by weight silica with the remainder of the composition being a fluxing agent. Such high silica glasses are generally employed ground to a fine mesh (e.g., 325 mesh). A typical high silica glass has the following composition: silica ($SiO_2$), 94–97%; fluxing agent, 3–6%. Especially preferred are high silica glasses wherein boric oxide is employed as the fluxing agent. Exemplary of such a high silica glass is Corning Glass Works No. 7913 having the following composition: $SiO_2$-96.5%; $B_2O_3$-3.5%. Boric oxide is the preferred fluxing agent because the resultant glasses exhibit a low coefficient of thermal expansion.

The emissivity agent is employed in the emissivity layer in a weight ratio of silica glass to emissivity agent of from about 50:1 to about 4:1 with a weight ratio of from about 19:1 to about 4:1 being preferred.

The emissivity coat layer, as above-described, is generally applied over the barrier coat in the form of an aqueous slurry, or dispersion, in which an effective amount of a suspension or thickening agent is employed to maintain the solids in suspension. One such suitable suspension agent is methyl cellulose. A great many other known suspension agents are suitable, as will be readily apparent to one skilled in the art. What constitutes an effective amount of suspension agent will depend upon the efficacy of the particular suspension agent and can be readily determined. Whenever methyl cellulose (powdered, 4,000 cps) is employed, for example, it is used in a relatively dilute aqueous solution, e.g., 0.5 wt.%, and the aqueous solution is generally employed in an amount such that the solids content of the coating composition is from about 10 wt.% to about 90 wt.%, with a solids content of from about 25 wt.% to about 75 wt.% being preferred.

The emissivity coat layer in the form of the slurry or dispersion is applied to the cooled specimen over the barrier coat layer by spraying or other suitable application device. The slurry should be applied to a thickness of from about 9 to about 12 mils. After drying, the emissivity coat layer is fired at a temperature of from about 1,700°F. to about 2,500°F., and preferably from about 2,200°F. to about 2,500°F., for a period of approximately 15 minutes. The specimen is thereafter allowed to cool to room temperature.

The top coat or final layer of the three-layer ceramic coating of the instant invention is designated an overglaze coat. The overglaze coat provides a smooth, hard, moisture-impervious surface which is resistant to crazing under repeated cycles of thermal shock. The overglaze coating of the instant invention comprises a high silica glass component of similar composition to that described hereinbefore and a borosiliate glass component having the following composition: $SiO_2$, 70–87%, $B_2O_3$, 10–20%; $Na_2O$, 2–5%; and $Al_2O_3$, 1–5%. A typical borosilicate glass composition is Corning Glass Works No. 7740 having the following composition: $SiO_2$, 80.4%; $B_2O_3$, 13.3%; $Na_2O$, 4.3%; $Al_2O_3$, 2.0%. Both glasses are generally employed ground to a 325 mesh. It has been found that the combination of a high silica glass and a borosilicate glass in the proper ratios provides a suitable overglaze coat which is smooth, free from cracking and is moisture-tight. The use of a high silica glass component alone as the overglaze coat results in a porous coating, whereas the use of a borosilicate glass component alone as the overglaze coat results in a high gloss coating in which crazing is noticeable under the microscope. Only enough of the borosilicate glass should be employed to obtain the desired continuous vitreous surface in the overglaze coat.

The high silica glass component and the borosilicate glass component are employed in a weight ratio of from about 3:1 to about 19:1, with best results being obtained with ratios of from about 9:1 to about 19:1. The tendency toward crazing increases as the borosilicate glass component concentration increases.

While it is equivalently useful to prepare the overglaze layer employing a single glass component having the same overall composition as the two-glass compositions illustrated, such glass compositions are not generally commercially available. The illustration of the two-glass component recipe, therefore, represents only a preferred mode for the practice of this invention. The number of glass components employed to yield the overall composition in any single layer is not to be considered a limitation of the overall inventive concept. Therefore, it is contemplated that a single glass or a plurality of glasses, as described, having the overall composition above described is within the scope of the instant invention.

The overglaze coat layer is applied over the emissivity coat by air spraying or by other suitable applicator device to a thickness of from about 2 to about 4 mils. After drying, the coating is fired under conditions similar to those described for the emissivity coat.

In the accompanying FIGURE, there is depicted a structural laminate illustrating a substrate or base 10 to which there is adhered a layer of rigid, fibrous silica insulation 12 over which there is adhered the barrier layer 14, the emissivity layer 16 and the overglaze layer 18 of the ceramic glaze coating of the instant invention.

The ceramic glaze coating described herein can be applied to all contoured shapes and sharp-edged corners without delamination or cracking problems. Conchoidal chipping will occur when the coating is cut on a band saw, but fully coated panels can be machined to an exact final size by grinding with a diamond or alumina wheel without apparent detriment to the coating. Structural laminates or panels formed in accordance with the instant invention are moisture-impervious and will withstand repeated exposure to cyclical temperature differences of from about −250°F. to about 2,500°F. for extended periods without delamination or spalling.

Illustrative of the foregoing discussion and description and not to be interpreted as a limitation on the scope thereof or on the materials herein employed, the following example is presented:

EXAMPLE I

In the following Example, there are described the preparations of each of the three components of the ceramic coating of the instant invention and a description of the application technique by which they are employed.

The Barrier Coat

A fused silica aqueous slip containing approximately 82% solids was prepared using 99.6% silica ($SiO_2$) and water. The grain size of the fused silica was such that there was less than 3% retention on a Standard No. 325 sieve. The pH of the aqueous slip was adjusted to a pH of from 5 to 7.

The silica slip was applied to a 3 inch × 3 inch × 1 inch tile of fibrous silica having a density of approximately 13 pounds per cubic foot. The dense silica slip was applied by brushing with a soft, lint-free brush to a thickness of from about 4 to about 8 mils. The tile was then dried in an oven for 30 minutes at 250° F. after which it was placed in a furnace and fired at 2,200°F. for 15 minutes. It was then allowed to cool to ambient temperature.

The Emissivity Coat

To a plastic bottle were added 380 parts by weight of a high silica glass (Corning Glass Works No. 7913; 96.5% $SiO_2$, 3.5% $B_2O_3$), 20 parts by weight silicon carbide (1,200 grit) and 350 parts by weight of a 0.5% solution of methyl cellulose in water. These materials were dispersed with an air-driven mechanical mixer to form an aqueous slurry.

The emissivity coat in the form of the aqueous slurry was applied to the cooled specimen by spraying using a Binks spray gun, Model 18-V fitted with a pressure nozzle. The emissivity coat was sprayed to a thickness of 9 to 12 mils. The coating was allowed to air dry for approximately 10 minutes and was then dried in an oven for 30 minutes at 250°F. Thereafter, the specimen was placed in a furnace and heated to 1,000°–1,400°F. for approximately 20 minutes after which it was fired at a temperature of 2,500°F. for 15 minutes. The specimen was then allowed to cool to ambient temperature.

The Overglaze Coat

To a plastic bottle were added 380 parts by weight of the high silica glass of the composition employed in the intermediate coat, 20 parts by weight of a borosilicate glass (Corning Glass Works No. 7740; $SiO_2$, 80.4%; $B_2O_3$, 13.3%; $Na_2O$, 4.3%; $Al_2O_3$, 2.0%), and 350 parts by weight of a 0.5 wt.% solution of methyl cellulose in water. These constituent materials were then dispersed with an air-driven mechanical mixer.

The overglaze coat was applied to the cooled specimen by air spraying with the equipment used for the emissivity coat to a thickness of from about 2 to 4 mils. The specimen was allowed to air dry for 10 minutes, after which it was placed in an oven and dried for 30 minutes at 250°F. The specimen was then transferred to a furnace and heated to 1,000°–1,400°F. for approximately 20 minutes and was then fired at 2,500°F. for 15 minutes. The specimen was then allowed to cool to ambient temperature.

The test specimen was then subjected to cyclic thermal tests wherein the specimen was subjected to alternating high and low temperatures. In a test, the specimen was exposed to a pulse consisting of radiant heating to simulate the temperatures encountered in a re-entry into the atmosphere from a space orbit of approximately 100 nautical miles. The sample was exposed to a peak surface temperature of about 2,500°F. over a 50 minute interval. The sample was exposed to 3.5 hours of such cycling wherein the time at 2,500°F. peak was held approximately 3 minutes and the heat-up time was approximately 11 minutes and the cool-down time was 16 minutes. At the completion of the thermal cycling, the test specimen was then tested for moisture-tightness by placing droplets of water on the coated surface and allowing the specimen to stand for 5 minutes. The surface was then examined by microscope. The test specimen showed no absorption of water and there were no apparent cracks in the coating.

From the foregoing description and Example of this invention, those of ordinary skill in the art may make many modifications and variations therefrom without departing from the scope of the invention as hereinafter claimed.

We claim:

1. An insulating structure for withstanding repeated exposure to cyclical temperature changes of from about −250°F. to about 2,500°F., said structure comprising a substrate having thereon a moisture-impervious ceramic laminate coating which comprises:
   a. a barrier layer consisting essentially of fused silica, said barrier layer adhered to said substrate;
   b. an emissivity layer consisting essentially of a high silica glass and an emissivity agent selected from the group of silicon carbide, nickel oxide, chrome oxide, cobalt oxide, nickel-chrome spinel, silicon nitride, calcined mixed oxides of iron, chrome and cobalt, and mixtures thereof, with the weight ratio of high silica glass to emissivity agent being from about 50:1 to about 4:1; and
   c. an overglaze layer consisting essentially of a high silica glass and a borosilicate glass having a composition of from about 70 to about 87 wt.% $SiO_2$, from about 10 to about 20 wt.% $B_2O_3$, from about 2 to about 5 wt.% $Na_2O$ and from about 1 to about 5 wt.% $Al_2O_3$, with the weight ratio of high silica glass to borosilicate glass being from about 3:1 to about 19:1.

2. The insulating structure of claim 1 wherein said barrier layer is from about 4 to about 8 mils in thickness, said emissivity layer is from about 9 to about 12 mils in thickness, and said overglaze layer is from about 2 to about 4 mils in thickness.

3. The insulating structure of claim 1 wherein the weight ratio of the high silica glass to emissivity agent in said emissivity layer is from about 19:1 to about 4:1.

4. The insulating structure of claim 3 wherein the emissivity agent is selected from the group of silicon carbide, calcined mixed oxides of iron, chrome and cobalt and mixtures thereof.

5. The insulating structure of claim 4 wherein the weight ratio of high silica glass to borosilicate glass in said overglaze layer is from about 10:1 to about 19:1.

6. The insulating structure of claim 1 wherein said substrate is a low density, rigid, fibrous silica insulation having a density of from about 9 to about 20 pounds per cubic foot.

7. A method of rendering impervious to moisture a substrate which comprises sequentially applying to said substrate and firing at a temperature of from about 1,700°F. to about 2,500°F.
   a. a barrier coating consisting essentially of a fused silica slip having from about 80 to about 90 wt.% solids;
   b. an emissivity coating consisting essentially of a high silica glass, an emissivity agent selected from the group of silicon carbide, nickel oxide, chrome oxide, cobalt oxide, nickel-chrome spinel, silicon nitride, calcined mixed oxides of iron, chrome and cobalt and mixtures thereof, and an effective amount of a suspension agent in an aqueous slurry containing from about 10 to about 90 wt.% solids, with the weight ratio of high silica glass to emissivity agent being from about 50:1 to about 4:1; and
   c. an overglaze coating consisting essentially of a high silica glass, a borosilicate glass having a composition of from about 70 to about 87 wt.% $SiO_2$, from about 10 to about 20 wt.% $B_2O_3$, from about 2 to about 5 wt.% $Na_2O$, and from about 1 to about 5 wt.% $Al_2O_3$, and an effective amount of a suspension agent in an aqueous slurry containing from about 10 to about 90 wt.% solids, with the weight ratio of high silica glass to borosilicate glass being from about 3:1 to about 19:1.

8. The method of claim 7 wherein the weight ratio of high silica glass to emissivity agent in the emissivity coating is from about 19:1 to about 4:1.

9. The method of claim 8 wherein the emissivity agent is selected from the group of silicon carbide, calcined mixed oxides of iron, chrome and cobalt and mixtures thereof.

10. The method of claim 9 wherein the weight ratio of high silica glass to borosilicate glass in the overglaze coating is from about 10:1 to about 19:1.

11. The method of claim 10 wherein the solids content of the emissivity coating and the overglaze coating are from about 25 to about 75 wt.%.

12. The method of claim 11 wherein the suspension agent in the emissivity coating and the overglaze coating is methyl cellulose.

13. The method of claim 7 wherein the substrate is a low density, rigid, fibrous silica insulation having a density of from about 9 to about 20 pounds per cubic foot.

* * * * *